March 20, 1928.

P. G. FRAZIER 1,663,075

ROTARY VALVE STRUCTURE

Filed July 10, 1924

Witness

Inventor
Pearl G. Frazier
by Bair & Freeman Attorneys

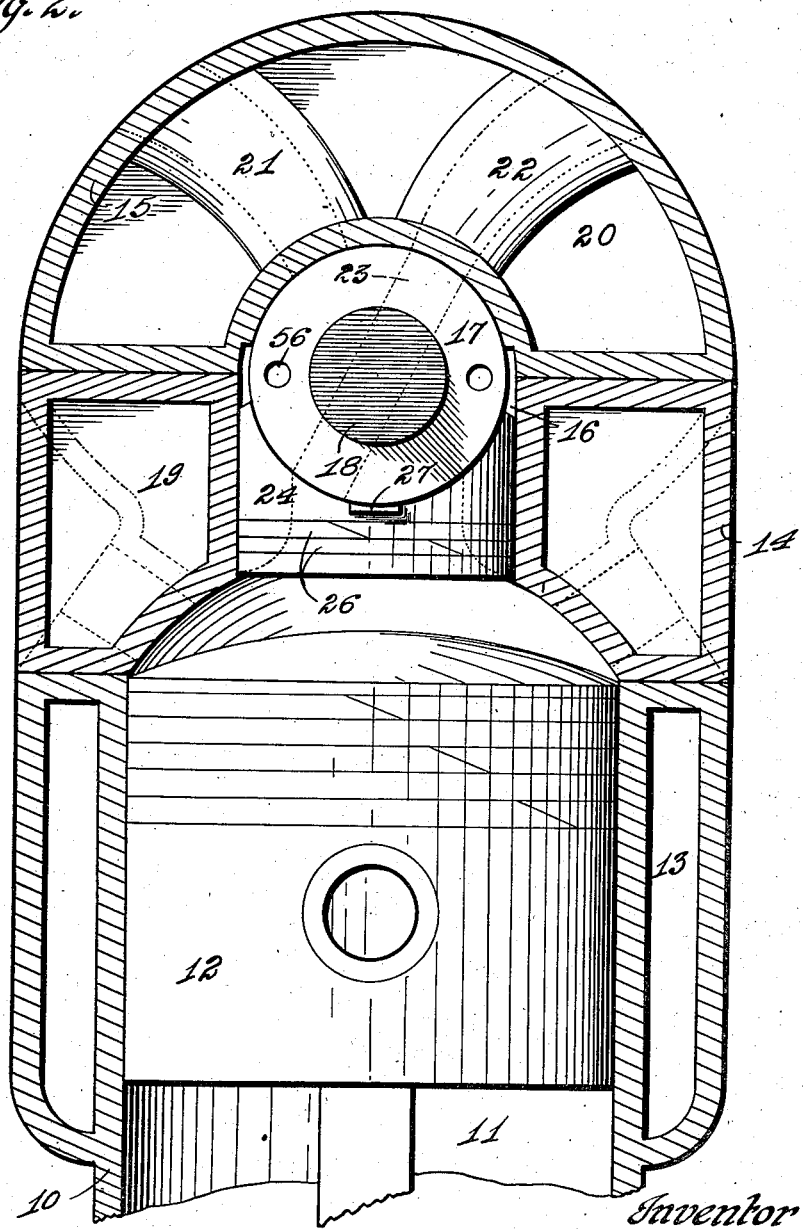

March 20, 1928.  1,663,075
P. G. FRAZIER
ROTARY VALVE STRUCTURE
Filed July 10, 1924  6 Sheets-Sheet 3
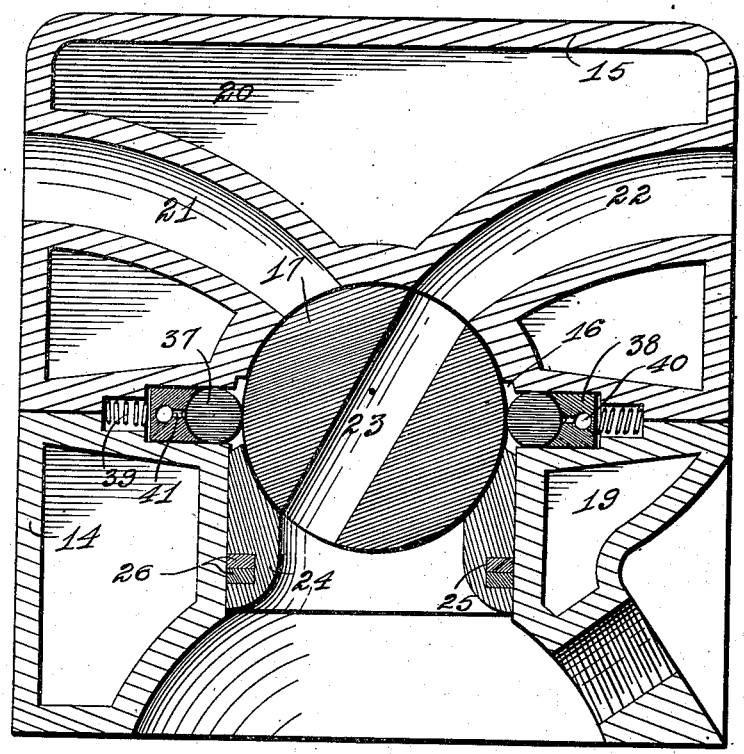
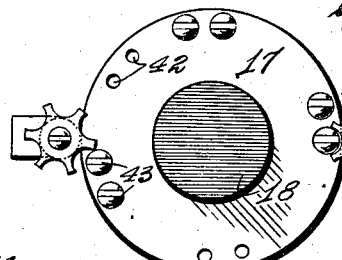
Inventor
Pearl G. Frazier
by Bair & Freeman Attorneys March 20, 1928.
P. G. FRAZIER
ROTARY VALVE STRUCTURE
Filed July 10, 1924
1,663,075
6 Sheets-Sheet 4
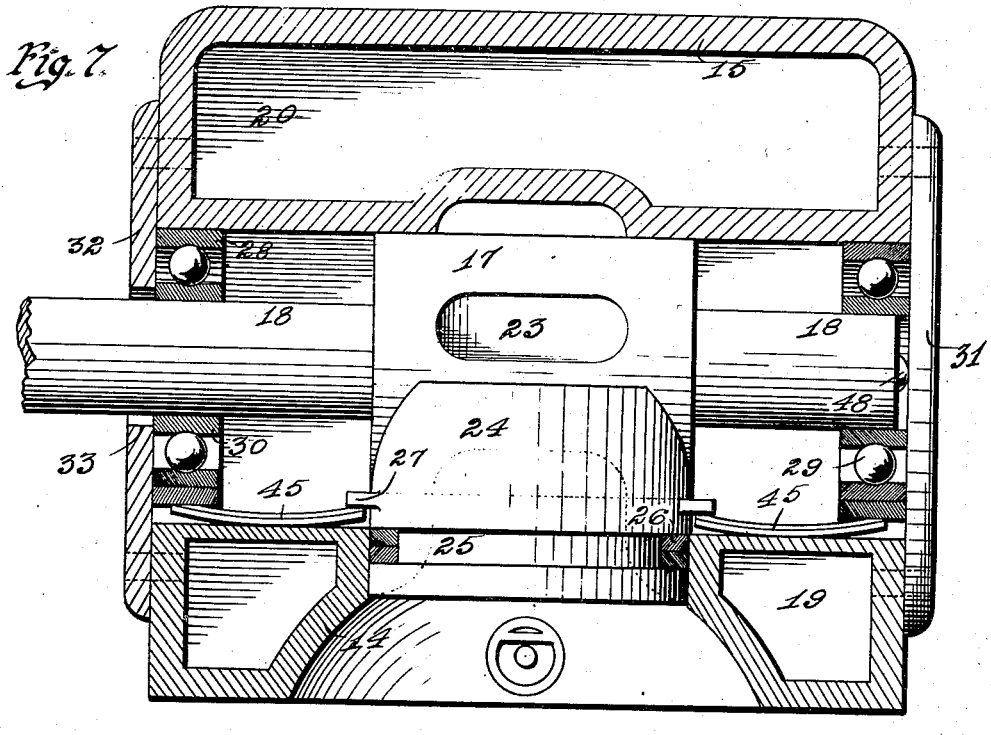
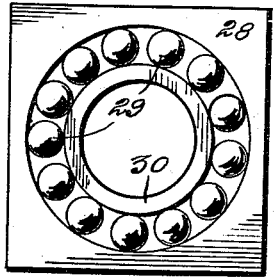
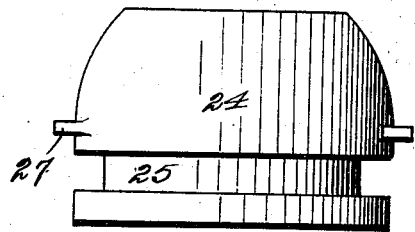
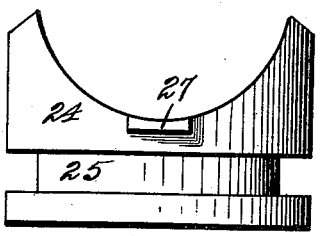
Witness
Inventor
Pearl G. Frazier
by Bair & Freeman Attorneys

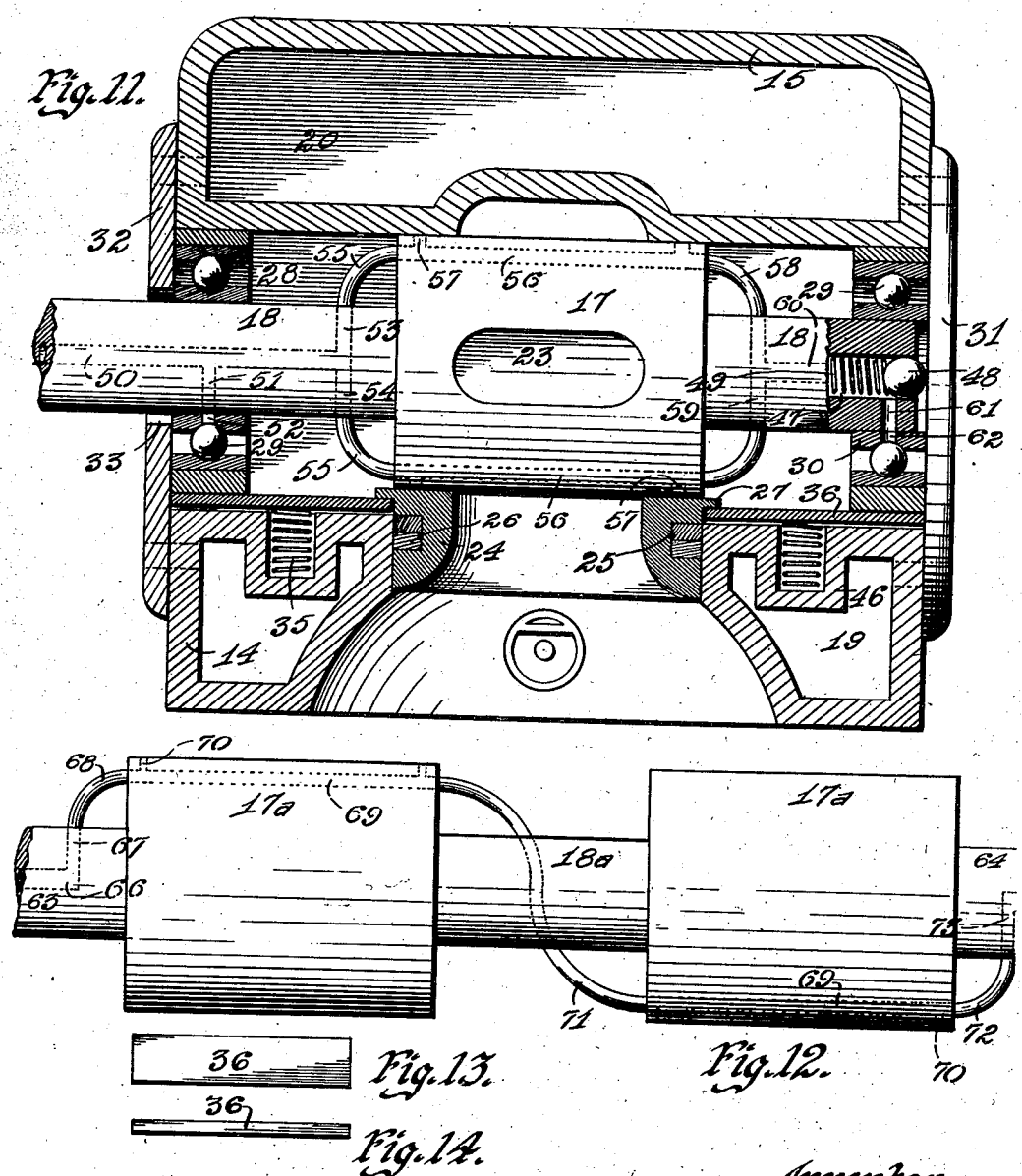

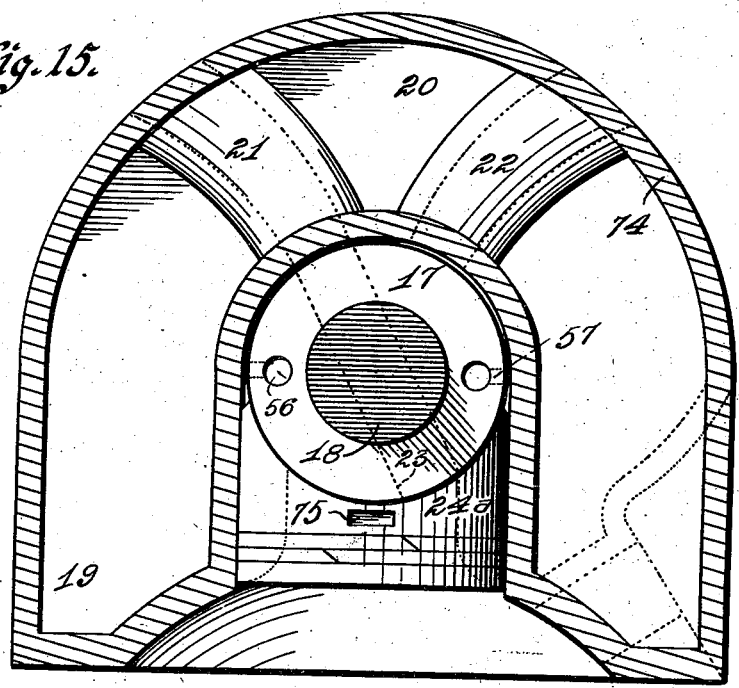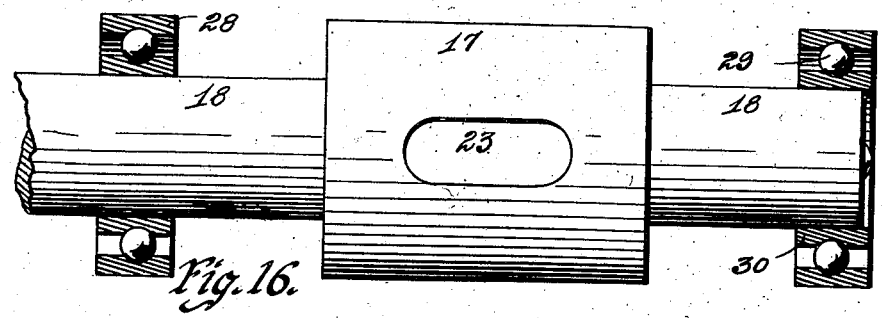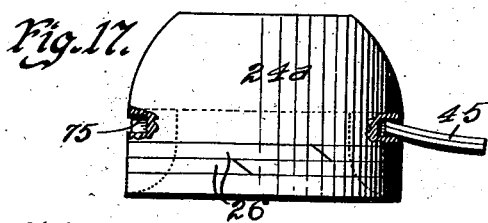

Patented Mar. 20, 1928.

1,663,075

UNITED STATES PATENT OFFICE.

PEARL G. FRAZIER, OF ANKENY, IOWA.

ROTARY-VALVE STRUCTURE.

Application filed July 10, 1924. Serial No. 725,147.

The purpose of my invention is to provide a rotary valve structure adapted for use in internal combustion engines and also for a great variety of other uses.

A further purpose of my invention is to provide in such a structure novel means for mounting the valve for providing for expansion and contraction.

Still another purpose is to provide in such a structure means for affording complete and properly regulated lubrication for the rotary valve and adjacent parts.

A further object is to provide in combination with such a valve an engine head of simple and novel structure which can be made inexpensively and is peculiarly adaptable for convenient assembling and disassembling for permitting easy access to the parts.

With these and other objects in view, my invention consists in the construction, arrangement and combination of the various parts of my rotary valve structure, whereby the objects contemplated are attained, as hereinafter more fully set forth, pointed out in my claims, and illustrated in the accompanying drawings, in which:

Figure 2 shows a detail, sectional view taken on the line 2—2 of Figure 1.

Figure 3 is a detail, sectional view taken on the line 3—3 of Figure 1.

Figure 4 is a perspective view of one of the roller lubricating members.

Figure 5 is a perspective of one of the roller members.

Figure 6 is a sectional view of a modified form of the rotary valve illustrating the roller lubricating members in end elevation.

Figure 7 is a longitudinal, sectional view of a slightly different form of the rotary valve structure.

Figure 8 is an elevation of one of the bearing sleeves.

Figure 9 is an elevation of the sleeve taken at right angles to the view shown in Figure 8.

Figure 10 is a diagrammatic elevation of one of the ball bearing units.

Figure 11 is a longitudinal, sectional view of a slightly different form of the rotary valve structure.

Figure 12 is an elevation of a form of the rotary valve illustrating part of the lubricating means.

Figure 13 is a plan view of one of the adjustable bearing plates.

Figure 14 is a side elevation of the same.

Figure 15 is a transverse, vertical sectional view of a slightly different form of rotary valve structure embodied in an engine head.

Figure 16 is an elevation of one form of valve.

Figure 17 is an elevation of a sleeve used with the form of engine head shown in Figure 15.

Figure 18 is a plan of a leaf spring used with the form of device shown in Figures 15 and 17; and Figure 19 is a side elevation of said leaf spring structure.

Figure 1:
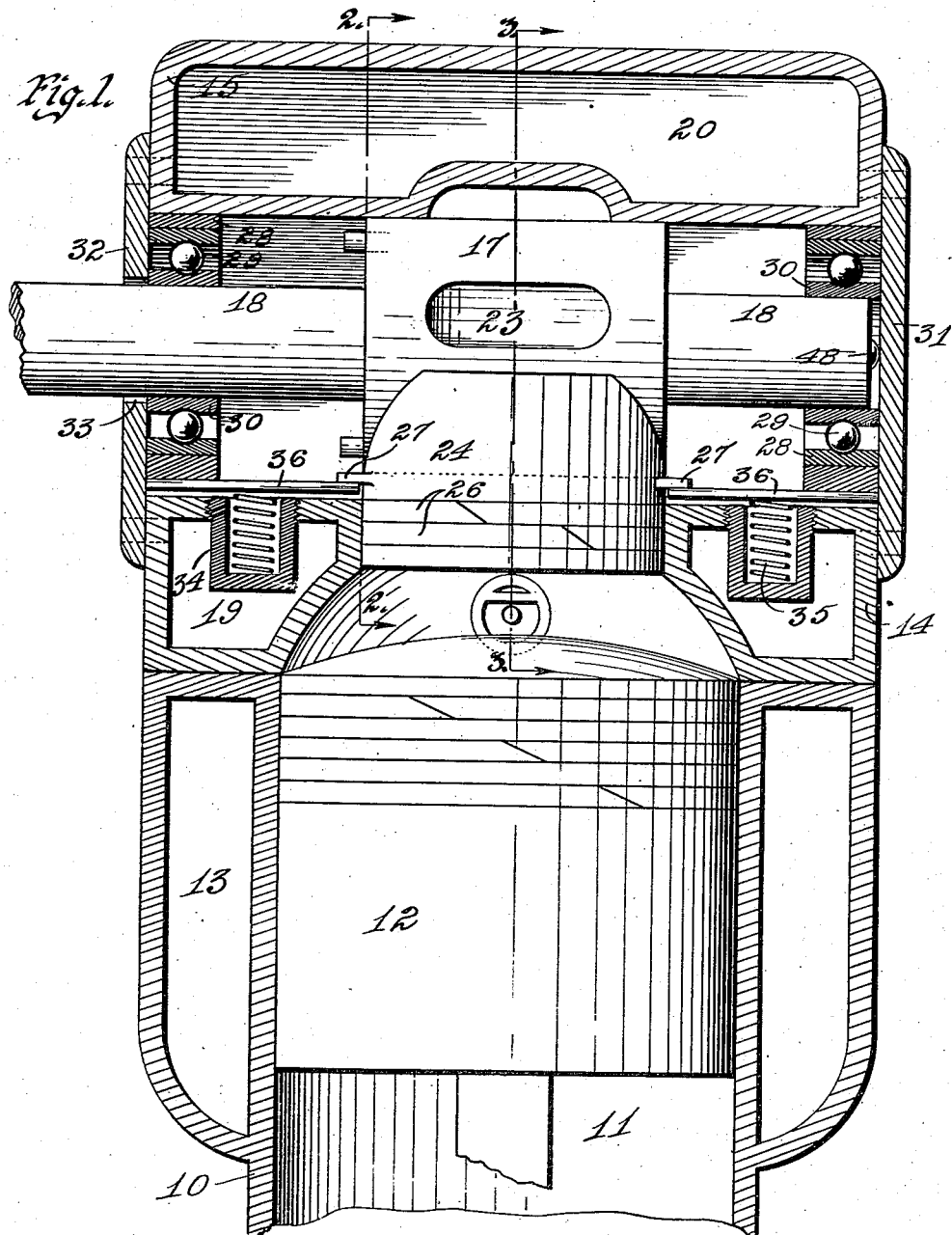
Figure 1 shows a longitudinal, sectional view through a rotary valve structure embodying my invention.

While my improved rotary valve may be employed in a great variety of environments, I have illustrated it herein in connection with a rotary engine body and head.

In the accompanying drawings, I have used the reference numeral 10 to illustrate an engine block having the cylinder 11 in which is mounted the ordinary piston 12. The body or block 10 is provided with the water jacket structure 13.

Above the body 10 is a head, comprised of the lower part 14 and the upper part 15. The lower part 14 of the head is provided with a vertical opening or passage 16 above the combustion chamber of the cylinder 12 and the upper head portion 15 is shaped to receive a rotary valve 17 above the passage 16, having the reduced spindle shaped portions 18 on opposite sides of the valve body 17.

It will, of course, be understood that there are as many of the enlarged valve body portions 17 as there are cylinders in the engine.

The lower head portion 14 has the water jacket 19 and the upper portion 15 has the water jacket 20 and the intake and exhaust passages 21 and 22 extending from the valve chamber through the water jacket.

The valve has a passage 23 extending through it.

Received in the opening 16 is a tubular sleeve 24, shown in Figures 1, 2, 3 and 8, forming a bearing for the lower part of the valve.

The sleeve 24 has near its lower portion a ring groove 25 in which are set ordinary expansion rings 26. (See Figures 1 and 8.)

In the form of the device shown in Figures 1, 2 and 3, the sleeve 24 has a projecting lug 27, as shown for instance in Figure 1.

At the ends of the engine head are inset ball bearing assemblings, as shown in Figures 1 and 10, each comprising a boxing 28 forming one ball race, which is square in outline, and the balls 29, and the inner tubular ball race 30 received on the spindle.

The ends of the engine head have the cover plates 31 and 32 closing the valve chamber at the ends.

The plate 32 is provided with an opening 33 through which one of the spindle portions 18 projects, as shown in Figure 1.

In the form of the device shown in Figure 1, spring receiving cups 34 are screwed into the heads, as shown in Figure 1, to receive coil springs 35 upon which rest plates 36 (see Figures 1 and 13).

One end of each plate 36 rests beneath one of the lugs 27, as shown in Figure 1, and the other end rests beneath one of the ball bearing boxings 28. This is an important feature of the structure of the present invention, insomuch as it provides for tight bearings while also providing for expansion and contraction.

If the valve expands, the plate 36 may be forced downwardly against the springs 35 sufficient to take care of the expansion. When the parts contract, the springs will force the plates 36 upwardly, raising the ball bearing and the sleeve 24 for maintaining a tight bearing for the valve and for preventing any possible binding of the valve.

In the form of the device shown in Figures 1, 2 and 3, I provide at the sides of the valve, roller lubricating devices. The head members 14 and 15 are cut away to receive rollers 37 on opposite sides of the enlarged body portion 17 of the valve, as shown for instance in Figure 3. Sliding bars 38 form bearings for the outer surfaces of the rollers 37 and are pressed toward the rollers 37 for thus holding the rollers 37 in contact with the valve 17 by means of springs 39, shown in Figure 3. The bars 38 have passages 40 extending lengthwise thereof for oil, and short passages 41 extending from the passages 40 to the bearing faces of said bars for carrying lubricant to the roller lubricating members 37.

It will be seen that the rollers 37 will carry the oil to the surface of the valve 17.

It is my belief that the contact of the rollers 37 with the valve 17 will cause the rotation of the rollers 37, but for the purpose of insuring positive rotation of the rollers, I have provided the following means:

At the ends of the body portion 17 of the valve are provided holes 42 properly located to receive pins or the like 43.

Supported at the ends of the rollers 37 are star wheels or the like 44 arranged to coact with the pins 43 in such manner that the rotation of the valve will impart rotation to the rollers 37. The pins 43 are so located that the rollers 37 will not be positively actuated when the ends of the passage 23 are passing the rollers 37.

In Figure 7 is illustrated a slightly different form of my invention, in which there are the engine head members 14 and 15, and the other parts as heretofore described, excepting, however, that the removable spring receiving cups 35 are omitted, and I substitute for the plates 36 and springs 35, curved leaf springs 45, the central portions of which bear against the head member 14 and the ends of which bear against the boxing 28 and the lug 27 in each instance.

In Figure 11 is shown a slightly different form of my invention in which the springs 35 are mounted in cups 46 formed integral with the lower engine head member 14.

The other parts are similar to the device shown in Figure 1 with the following exceptions.

At the end of the valve adjacent to the plate 31, the reduced spindle portion 18 is provided with a recess 47 receiving a ball 48 and a spring 49 for pressing the ball against the plate 31.

It will thus be seen that the ball 48 and spring 49 provide for lengthwise expansion of the valve.

Furthermore, I have provided in the device shown in Figure 11, a slightly different form of lubricating means.

A passage 50 extends lengthwise through the longer spindle member 18 almost to the body of the valve 17 as shown by dotted lines in Figure 11. A by-pass 51 extends from the passage 16 to a passage 52 through the boxing 28 of one of the ball bearing assemblies.

The inner end of the passage 50 is communicated with by two by-passes 53 and 54 leading to the exterior of the spindle 18 in which the passage 50 is found.

Tubes 55 communicate with the passages 54 and with passages 56 extending lengthwise through the valve body 17. Short passages 57 are provided for conducting lubricant from the passages 56 to the bearing portion of the head 15 and to the upper surface of the sleeve 24.

At the opposite end of the valve 17 from that having the tubes 55, the passages 56 communicate with similar tubes 58 by which lubricant is conducted to passages 59 communicating with a passage 60 extending lengthwise of the shorter spindle member 18 to the opening 47.

A passage 61 extends from the opening 47 to the exterior of the spindle 18 now under consideration for conducting lubricant to a passage 62 through the ball bearing member 28 to the ball bearings.

In Figure 12, I have shown a valve provided with a slightly different lubricating means. In Figure 12, I have shown the valve of a type used for a plurality of cylinders, the valve having the valve bodies 17ª connected by a short spindle 18ª and having at their opposite ends spindle portions 63 and 64.

An oil passage 66 extends lengthwise of the spindle 63 and thence laterally to the surface thereof, as at 67. A tube 68 leads from the passage 67 to a passage 69 extending longitudinally through the valve 17ª. By-passes 70 lead from the passage 16ª to the exterior of the valve 17ª. The passages 69 of the valve 17ª are located diametrically opposite each other in the respective valve bodies 17ª and they are connected by a tube 71 extending spirally around the connecting spindle 18ª.

A tube 72 leads from the passage 69 of the right-hand valve body 17ª to a passage 73 through the spindle 64 for lubricating the bearings of the spindle 64.

In Figure 15, I have shown my rotary valve 17 mounted in a one-piece engine head 74.

In the form of the embodiment of the invention shown in Figure 15, the sleeve 24ª is slipped into position from below. The sleeve 24ª differs from the sleeve 24 in that it has grooves or the like 75 to receive the ends of leaf springs 45 of the kind already described.

A valve structure of the kind herein described has a large number of advantages, many of which will be obvious from the foregoing description.

It will be seen in the first place that the sleeve 24, shown in Figure 1, and the sleeve 24ª, shown in Figure 15, are of very simple and inexpensive construction as compared with other devices heretofore used for somewhat similar purposes.

The structure shown in Figure 1 is such as to provide properly for the expansion and contraction of the valve and the adjacent parts insomuch as the opening in the engine head, which receives the valve, the upper part of the sleeve 24 and the ball bearing assemblings is large enough to allow some vertical movement of the sleeve 24 and the ball bearing assemblings.

Yet by means of the plates 36 and springs 35, the ball bearing assemblings and the sleeves 24 are yieldingly held at their upper limit of movement.

Any compression in the engine cylinder will tend to force the valve upwardly against the firm bearings, but will never tend to force it downwardly against the springs 35.

There are thus provided bearings for the valve, which are at all times tight and which yet provide for the expansion and contraction in such a way as to prevent any binding of the valve.

It, of course, is obvious that where the spring cups 34 are used to screw into position, their position may be varied for regulating the tension of the springs 35.

It will be noted that I have provided in this form of the device particularly as shown in Figures 3 and 6, the rotary lubricating rollers 37 for providing oil to the valve and adjacent parts.

If the frictional engagement between the valve and the rollers 37 is sufficient to impart rotation to the rollers, it will be seen that the speed of rotation of the rollers will vary according to the speed of rotation of the valve for thus increasing the lubrication when the valve rotates rapidly and decreasing it when the valve rotates slowly.

The same result is, of course, accomplished if the rollers are rotated by means of the positive actuating devices shown in Figure 6.

The modified form of the spring pressure devices shown in Figures 7 to 11 embody the same general principles as the spring pressure devices illustrated in Figure 1.

In Figures 11 and 12 are shown different types of lubricating means in which centrifugal force is employed for facilitating the flow of lubricant.

In Figure 15, is shown a structure of an engine head which can be made at a very low expense and yet can be used with a rotary valve and the bearings therefor, so constructed and arranged as to provide for taking care of expansion and contraction of the valve and the adjacent parts.

It will, of course, be understood that the valve structure may be modified for use with engines of different numbers of cylinders.

The valve structure can be employed in a water-cooled engine of the type herein illustrated, but it can also be used with engines of the air-cooled type.

A valve of this type could be used in steam installations or for compressed air or a great variety of purposes, as well as for taking care of the fuel and exhaust gases of the internal combustion engines.

It should perhaps be mentioned that with both oiling systems, to-wit, that illustrated in Figure 3 and that illustrated in Figure 11, the oil is supplied to the valve oiling system by pressure from a pump in the ordinary way, and that in the form of structure shown in Figure 3, oil is supplied to the valve bearing surfaces by the rollers 37, while in the form shown in Figure 11, the oil is supplied through the passages and tubes shown therein and above described, to the valve bearing surfaces.

As shown in Figure 3, the valve and adjacent parts are arranged for one-quarter timing. The passage 23 registers with the intake passage 21 and the opening through the sleeve 24 for taking in fuel. Then during the upward movement of the piston for compression, and its downward forcing stroke, the passage 23 is closed by the anti-clockwise movement of the valve. On the next upward stroke of the piston, the passage 23 registers with the sleeve and the exhaust passage 22 for exhausting the burnt gases. Thus during the four cycle movement of the piston, the valve makes one revolution.

Changes may be made in the details of the structure and arrangement of the parts of my improved rotary valve device without departing from the real spirit and purpose of my invention, and it is my intention to cover by my claims, any modified forms of structure or use of mechanical equivalents, which may be reasonably included within their scope.

I claim as my invention:—

1. In a rotary valve structure, a valve chamber, a passage communicating therewith, a rotary valve mounted in said chamber, a sleeve in said passage having no parts of a maximum diameter greater than that of the passage and having grooves, said sleeve being mounted for slight vertical adjustment to take care of expansion and contraction, and means projected into said grooves for imparting yielding pressure on said sleeve in one direction.

2. In a rotary valve structure, a valve chamber, a passage communicating therewith, a rotary valve mounted in said chamber, a sleeve in said passage, bearings in said chamber for said valve, said sleeve and said bearings being mounted for slight vertical adjustment to take care of expansion and contraction, and means for imparting yielding pressure on said bearings and sleeve in one direction for making a tight joint, said means including in each instance a spring-pressed element engaging one of the bearings and sleeve.

3. In a structure of the class described, the combination of an engine cylinder having a reduced, vertical passage at its upper end, a valve chamber extending transversely above the passage, a sleeve in said passage projecting into the valve chamber having no parts of a maximum diameter greater than that of the passage, whereby the sleeve may be inserted into the passage from the cylinder, said sleeve being mounted for slight vertical adjustment to take care of expansion and contraction, and means for yieldingly pressing the sleeve toward the valve.

4. In a rotary valve structure, a cylinder, a valve chamber, a passage between the cylinder and the chamber, a rotary valve mounted in said chamber, a sleeve in said passage adapted to be slipped into the passage from the cylinder and projecting into the chamber, for said valve, said sleeve being mounted for slight vertical adjustment to take care of expansion and contraction, and means for imparting yielding pressure on said sleeve in one direction for making a tight joint.

5. In a rotary valve structure, a valve chamber, a passage communicating therewith, a rotary valve mounted in said chamber, a sleeve in said passage having no parts of a maximum diameter greater than that of the passage, said sleeve being mounted for slight vertical adjustment to take care of expansion and contraction, means for imparting yielding pressure on said sleeve in one direction, and means for providing for lengthwise expansion and contraction of the valve.

6. In a rotary valve structure, a valve chamber, a passage communicating therewith, a rotary valve mounted in said chamber, a sleeve in said passage, bearings in said chamber for said valve, said sleeve and said bearings being mounted for slight vertical adjustment to take care of expansion and contraction, and means for imparting yielding pressure on said bearings and sleeve in one direction for making a tight joint, adapted when tensioned by expansion adjacent to the sleeve to exert greater pressure on the bearings, and when tensioned by expansion adjacent to the bearings to exert greater pressure on the sleeve.

7. In a rotary valve structure, a valve chamber, a passage communicating therewith, a rotary valve mounted in said chamber, a sleeve in said passage, bearings in said chamber for said valve, said sleeve and said bearings being mounted for slight vertical adjustment to take care of expansion and contraction, and means for imparting yielding pressure on said bearings and sleeve in one direction for making a tight joint, and means for providing for lengthwise expansion and contraction of the valve, said means being carried by the valve to travel bodily therewith in the expansion or contraction of the valve toward or from said passage, and including a spring in the valve and an anti-friction device interposed between the spring and the end of the valve chamber.

8. In a structure of the class described, a valve casing having a valve chamber therein, a passage extending through said casing and communicating with said chamber, a valve in said chamber, a sleeve in said passage forming a bearing for said valve, bearings for said valve on opposite sides of said passage, said bearings being capable of slight movement in directions at right angles to the longitudinal axis of the valve, and means for imparting yielding pressure on said sleeve and said bearings, said means in each instance being spring-pressed and adapted to bear against one of the bearings and against the sleeve.

9. In a structure of the class described, a rotary valve chamber, a cylindrical rotary valve therein, a rotary member arranged alongside said valve to rotate therewith, a slidable bar adjacent to the rotary member, said bar having means for supplying lubricant to the rotary member and thus to the valve, and means for yieldingly pressing the bar against the rotary member.

Des Moines, Iowa, July 7, 1924.

PEARL G. FRAZIER.